United States Patent
Yoshida et al.

(10) Patent No.: US 6,519,404 B1
(45) Date of Patent: Feb. 11, 2003

(54) METHOD AND APPARATUS FOR FABRICATING COATED OPTICAL FIBER, AND COATED OPTICAL FIBER

(75) Inventors: Motohide Yoshida, Yokohama (JP); Katsuyuki Tsuneishi, Yokohama (JP); Masao Koida, Yokohama (JP); Katsuya Nagayama, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/890,166

(22) PCT Filed: Jan. 26, 2000

(86) PCT No.: PCT/JP00/00380

§ 371 (c)(1), (2), (4) Date: Jul. 27, 2001

(87) PCT Pub. No.: WO00/44680

PCT Pub. Date: Aug. 3, 2000

(30) Foreign Application Priority Data

Jan. 27, 1999 (JP) .............................. 11-017904

(51) Int. Cl.[7] .............................. G02B 6/02; B05D 5/06
(52) U.S. Cl. ..................... 385/128; 385/127; 427/163.1
(58) Field of Search ................... 385/127, 128; 427/163.1

(56) References Cited

U.S. PATENT DOCUMENTS 5,721,800 A * 2/1998 Kato et al. .................. 385/127
6,026,207 A * 2/2000 Reddy et al. ................ 385/128

FOREIGN PATENT DOCUMENTS

| EP | 0582405 | 2/1994 |
| EP | 0744636 | 11/1996 |
| EP | 0795521 | 9/1997 |
| JP | 09-243833 | 9/1997 |
| JP | 10-310456 | 11/1998 |

* cited by examiner

Primary Examiner—Georgia Epps
Assistant Examiner—Jack Dinh
(74) Attorney, Agent, or Firm—McDermott, Will & Emery

(57) ABSTRACT

In a fabrication method of coated optical fiber 21, the coated optical fiber 21 is fabricated by heating to soften an end of an optical fiber preform 11 to draw a glass fiber 13 out therefrom, laying coatings 16, 19 on the glass fiber 13 to make the coated optical fiber 21, and guiding the coated optical fiber 21 via a swing guide roller 23 periodically swinging, to twist the coated optical fiber 21, thereby imparting twists about the axis to the glass fiber 13 inside the coated optical fiber 21. The fabrication method comprises a step of passing the coated optical fiber 21 having passed the swing guide roller 23, through a free zone (between 26 and 27) in which the coated optical fiber 21 is allowed to freely rotate about the axis, and thereby longitudinally canceling out elastic torsion stored in the coated optical fiber 21 because of longitudinally alternate inversion of twist directions thereof, wherein a zone length L (m) of the free zone is not less than Lo (m) defined as follows:

Lo (m)=[a maximum drawing speed of the coated optical fiber (m/min)]/[the number of clockwise and counter-clockwise swing motions per unit time of the swing guide roller (motions/min)].

9 Claims, 5 Drawing Sheets

METHOD AND APPARATUS FOR FABRICATING COATED OPTICAL FIBER, AND COATED OPTICAL FIBER

TECHNICAL FIELD

The present invention relates to a method and apparatus for fabricating a coated optical fiber while reducing polarization mode dispersion, and to a coated optical fiber fabricated thereby.

BACKGROUND ART

In a conventional fabrication method of fiber drawing by heating to soften one end of an optical fiber preform and pulling a glass fiber downward therefrom, it was difficult to make the glass fiber with a core portion and a cladding portion around it in perfectly circular and concentric cross section, and their cross section was usually slightly elliptic or of slightly distorted circle shape. For this reason, the refractive index distribution in the cross section of the glass fiber wan not perfectly uniform and this caused the difference between group velocities of two polarized waves in the cross section of the glass fiber, the problem of increase in polarization mode dispersion has occurred.

Large polarization mode dispersion would raise a problem, particularly, when an optical fiber cable is used in practice as a submarine cable or a main cable required performance of which is large-capacity and long-haul transmission. A solution to this problem of polarization mode dispersion is a fabrication method of coated optical fiber, e.g., as disclosed in Japanese Patent Application Laid-open No. H9-243833, in which the glass fiber is drawn and coated to obtain a coated optical fiber and the coated optical fiber is guided by a guide roller periodically swinging the direction of its rotation axis, thereby imparting predetermined twists to the glass fiber.

FIG. 3 shows the fabrication steps of this method. An optical fiber preform 11 placed in a drawing furnace 12 is heated to soften at one end thereof and a glass fiber 13 is pulled vertically downward therefrom under drawing tension of a take-up unit 26 described hereinafter. At this time, the outside diameter of the glass fiber 13 is measured by outside diameter gauge 14 and a controller not shown controls the drawing speed, feed speed of the optical fiber preform, etc. so as to keep the fiber diameter in a prescribed range.

A coating die 15 applies an ultraviolet (UV)-curable resin 16 onto the periphery of glass fiber 13 and a UV emitting unit 17 emits UV light to cure the resin 16, thereby forming a coating. A coating die 18 further applies a UV-curable resin 19 onto the periphery of the coating and an UV emitting unit 20 emits UV light to cure this resin 19, thereby forming a second coating and obtaining a coated optical fiber 21. After that, the coated optical fiber 21 is guided via guide rollers 22, a swing guide roller 23, guide rollers 24, 25, and the take-up unit 26 to be wound onto a winding-up reel 27.

The following will explain the principle of imparting the twists to the glass fiber by the swing guide roller. FIG. 4 is a plan view of the swing guide roller. A roller rotation axis 23b of the swing guide roller 23 is always within the horizontal plane even during swinging and swings in a clockwise and a counterclockwise motion of a fixed period within an angular range of ±θ with respect to a reference position about a vertical axis 23c passing the center of the swing guide roller 23.

Accordingly, when the swing guide roller 23 swings from the reference position in the direction A in the figure, it goes into a state of swing guide roller 23'; when swinging in the opposite direction B, it goes into a state symmetric therewith with respect to the reference position, though not shown. As a result, when the swing guide roller is at the reference position, the coated optical fiber 21 descending from above is in contact with a roller surface 23a at a point Pa and travels along the roller surface so that the traveling direction thereof is bent from the vertical direction to the horizontal direction. Then, the coated optical fiber 21 travels in the direction of arrow C.

When the swing guide roller swings to move to the position of 23', if the coated optical fiber 21 did not move on the roller surface 23a, the coated optical fiber 21 would first contact the roller surface 23a at a position of point Qa. However, since the coated optical fiber 21 is held under tension, the coated optical fiber 21 moves on the roller surface 23a to take the shortest course. This causes the first contact position of the coated optical fiber 21 with the roller surface 23a to move to a position of point Qb on the roller surface 23a. At this time, since friction acts between the coated optical fiber 21 and the roller surface 23a, the coated optical fiber 21 does not slide to move on the roller surface 23a, but the coated optical fiber 21 moves on the roller surface 23a while rolling about its axis. Namely, there appears the rolling motion of the coated optical fiber 21 about its axis.

When the coated optical fiber 21 rolls about its axis at the first contact position thereof with the swing guide roller 23, its rolling force is transmitted immediately above along the coated optical fiber 21 up to the softening position in the lower part of the optical fiber preform 11 from which the glass fiber is being drawn. Since the glass fiber 13 under drawing at the softening position in the lower part of the optical fiber preform 11 is still in a softening state and thus soft, the rolling force transmitted through the coated optical fiber 21 directly acts on the glass fiber 13 in the softening state at the tip of the optical fiber preform 11, so that a twist is imparted to the drawn glass fiber 13 in the softening portion at the tip of the optical fiber preform 11. Then the coatings are provided on the glass fiber 13 to make the coated optical fiber 21.

DISCLOSURE OF THE INVENTION

Since the optical fiber on the optical fiber preform side with respect to the swing guide roller works to transmit the rolling force generated by the rolling about the axis of the coated optical fiber at the position of the swing guide roller, mainly to the drawing portion of the glass fiber, the optical fiber itself is little subject to twisting strain between the tip of the optical fiber preform and the swing guide roller. However, the coated optical fiber 21 is twisted between the swing guide roller 23 and the guide roller 24 because of the rolling about the axis at the position of the swing guide roller 23. This twist reverses the twist direction according to inversion of the swing direction of the swing guide roller, and thus twists can be averaged in the longitudinal direction to cancel out each other. However, if the cancellation of twists in the longitudinal direction is insufficient because of existence of the guide roller and others, the residual twists will be stored in the coated optical fiber itself and move along with the travel of the coated optical fiber via the take-up unit 26 up to the winding-up reel 27.

The twists stored in the coated optical fiber are elastic torsion and thus internal stress always acts in directions to return the twists. Therefore, there will arise the problem that during a subsequent step of feeding the coated optical fiber out of the winding-up reel 27, portions of the coated optical fiber twine round each other to cause a groove state or in the worst case the coated optical fiber is forcibly drawn from the twining portions of the coated optical fiber to cause disconnection. This problem becomes more noticeable, particularly, with increase in the drawing speed in fabrication of the coated optical fiber.

The present invention provides a fabrication method and fabrication apparatus of coated optical fiber capable of relieving the elastic torsion remaining in the coated optical fiber to an unproblematic level even with increase in the drawing speed in fabrication, and also provides a coated optical fiber fabricated thereby.

The inventor had the idea that, in order to adequately cancel out the elastic torsion of the coated optical fiber in the longitudinal direction, a free zone to permit the coated optical fiber to freely rotate around the axis was provided between the swing guide roller and the winding-up reel and the coated optical fiber was allowed to twist only in this free zone, thereby reducing the residual torsion in the coated optical fiber wound up. The inventor thus conducted research to determine necessary conditions for the free zone with variations in the length of the free zone, the drawing speed in fabrication, and the number of clockwise and counterclockwise swing motions per unit time of the swing guide roller and checked the residual torsion of the coated optical fiber wound up on the winding-up reel in each of the cases. The free zone was constructed as a section in which the coated optical fiber was able to travel straight without touching any other member such as the guide roller.

The following method was used to check the residual torsion in the coated optical fiber wound up on the winding-up reel. With the coated optical fiber being wound on the winding-up reel, a mark was placed on the surface of the coated optical fiber facing to the front surface side of the winding-up reel and the coated optical fiber was fed by 1 m out of the winding-up reel to free the rotation about the axis, thereby perfectly releasing the residual, elastic torsion. Then the number of twists of the mark at that time was defined as the number of residual torsion in the coated optical fiber wound up on the winding-up reel. FIG. 5 is a diagram showing numbers of residual torsion by $\circ$, $\Delta$, and $\times$ in a graph in which the abscissa represents the ratio of the drawing speed in fabrication to the number of clockwise and counterclockwise swing motions of the swing roller per unit time and the ordinate the zone length of the free zone. The evaluation herein was made according to the following criteria: $\times$ for the number of residual torsion of not less than 1 twist/m, $\Delta$ for not less than 0.1 twist/m but less than 1 twist/m, and $\circ$ for less than 0.1 twist/m.

It is seen from FIG. 5 that the number of residual torsion can be controlled to below 0.1 twist/m when the length of the free zone is equal to or larger than (the drawing speed in fabrication/the number of clockwise and counterclockwise swing motions per unit time). Since the drawing speed is normally reduced immediately after a start of fabrication or immediately before an end of fabrication, it is preferable to apply a maximum drawing speed to the determination of the length L of the free zone. Letting Lo=(maximum drawing speed in fabrication)/(the number of clockwise and counterclockwise swing motions per unit time), the above inequality can be rewritten as L≧Lo. From these, when the free zone is set so as to satisfy L≧Lo, the residual torsion in the coated optical fiber wound up can be controlled in the preferable range of less than 0.1 twist/m.

The present invention has been accomplished on the basis of the foregoing finding and a fabrication method of coated optical fiber according to the present invention is a method of fabricating a coated optical fiber by heating to soften an end of an optical fiber preform to draw a glass fiber out therefrom, laying a coating on the glass fiber to make a coated optical fiber, and guiding the coated optical fiber via a swing guide roller periodically swinging, to twist the coated optical fiber, thereby imparting twists about the axis to the glass fiber inside the coated optical fiber, the method comprising a step of passing the coated optical fiber having passed the swing guide roller, through a free zone in which the coated optical fiber is allowed to freely rotate about the axis of the optical fiber, and thereby longitudinally canceling out elastic torsion stored in the coated optical fiber because of longitudinally alternate inversion of twist directions thereof, wherein a zone length L (m) of the free zone is not less than Lo (m) defined as follows:

Lo (m)=[a maximum drawing speed of the coated optical fiber (m/min)]/[the number of clockwise and counterclockwise swing motions per unit time of the swing guide roller (motions/min)].

In addition, a fabrication apparatus of coated optical fiber according to the present invention is an apparatus for fabricating a coated optical fiber, the apparatus comprising a drawing furnace for heating to soften an end of an optical fiber preform to draw a glass fiber out therefrom, a coating unit for laying a coating on the glass fiber, and a swing guide roller for twisting a coated optical fiber thus made with the coating, thereby imparting twists about the axis to the glass fiber, the apparatus comprising a free zone through which the coated optical fiber having passed the swing guide roller is made to pass in a free state of rotation about the axis, wherein a zone length L (m) of the free zone is not less than Lo (m) defined as follows:

Lo (m)=[a maximum drawing speed of the coated optical fiber (m/min)]/[the number of clockwise and counterclockwise swing motions per unit time of the swing guide roller (motions/min)].

In a preferable aspect, the free zone is a region between two guide members and is retained so that the coated optical fiber can travel straight between the two guide members while being maintained in a noncontact state with another member. In the free zone there may be provided at least one intermediate guide roller having a smooth roller surface for allowing the coated optical fiber to pass in a freely rotatable state about the axis. When the free zone is provided with such a guide roller having the smooth roller surface, the entire system can be constructed in relatively small size, as compared with those provided with a straight free zone.

The length of the free zone is preferably adjustable. This can be realized by locating a movable guide roller at least at one of the two ends of the free zone or by arranging at least one of intermediate guide rollers as movable. In this arrangement, the movable guide roller is moved on the occasion of hanging the coated optical fiber on the rollers to reduce the zone length L to below Lo, and after completion of the hanging, the movable guide roller is again moved to return the zone length L to the value not less than Lo, whereby the working zone for the hanging work can be shortened during the hanging of the coated optical fiber, so as to facilitate the work.

The fabrication method of coated optical fiber according to the present invention is suitably applicable to cases where the maximum drawing speed of the coated optical fiber is not less than 600 m/min and the number of clockwise and counterclockwise swing motions per unit time of the swing guide roller is not more than 300 motions/min. In the region of the maximum drawing speed of not less than 600 m/min the foregoing residual torsion becomes particularly significant, and if the number of clockwise and counterclockwise swing motions is set large over 300 motions/min in such a high speed region there will appear considerable variation in the glass diameter and heavy degradation of the appearance of the glass fiber. Therefore, it is necessary to control the number of clockwise and counterclockwise swing motions as described above.

BEST MODE FOR CARRYING OUT THE INVENTION

Figure 1A:
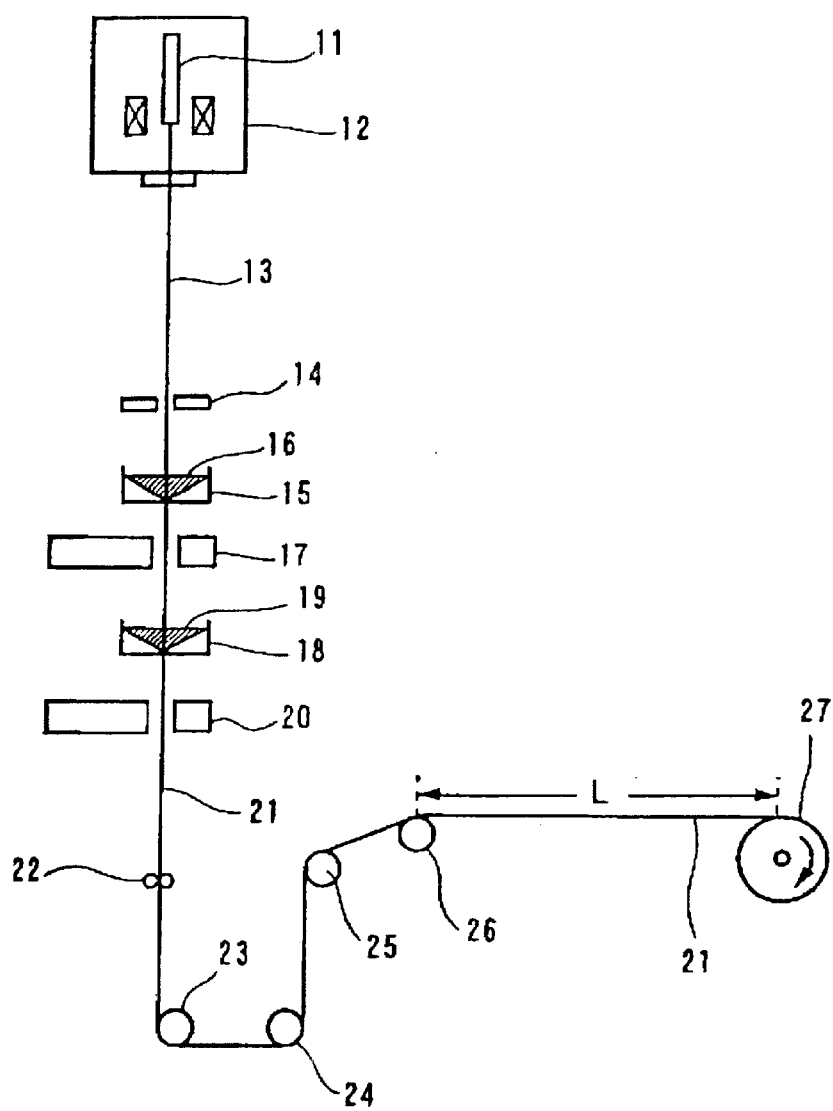
FIG. 1A is a view showing an embodiment of the fabrication apparatus of coated optical fiber according to the present invention, and FIG. 1B a view showing another embodiment of the free zone in this apparatus.

Preferred embodiments of the present invention will be described below in detail with reference to the accompanying drawings. To facilitate the comprehension of the explanation, the same reference numerals denote the same parts, where possible, throughout the drawings, and a repeated explanation will be omitted.

Figure 1B:
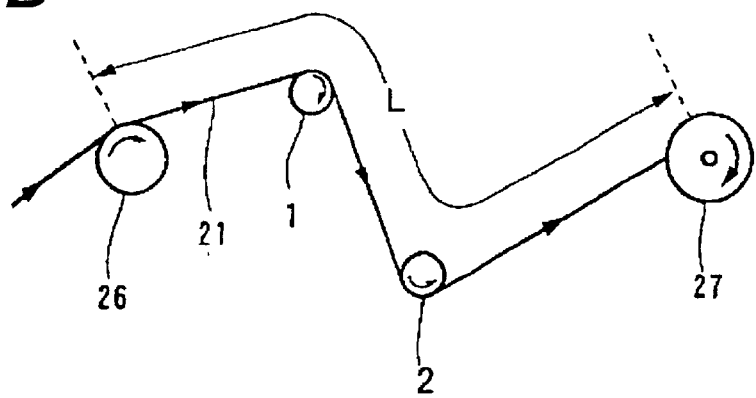
Figure 3:
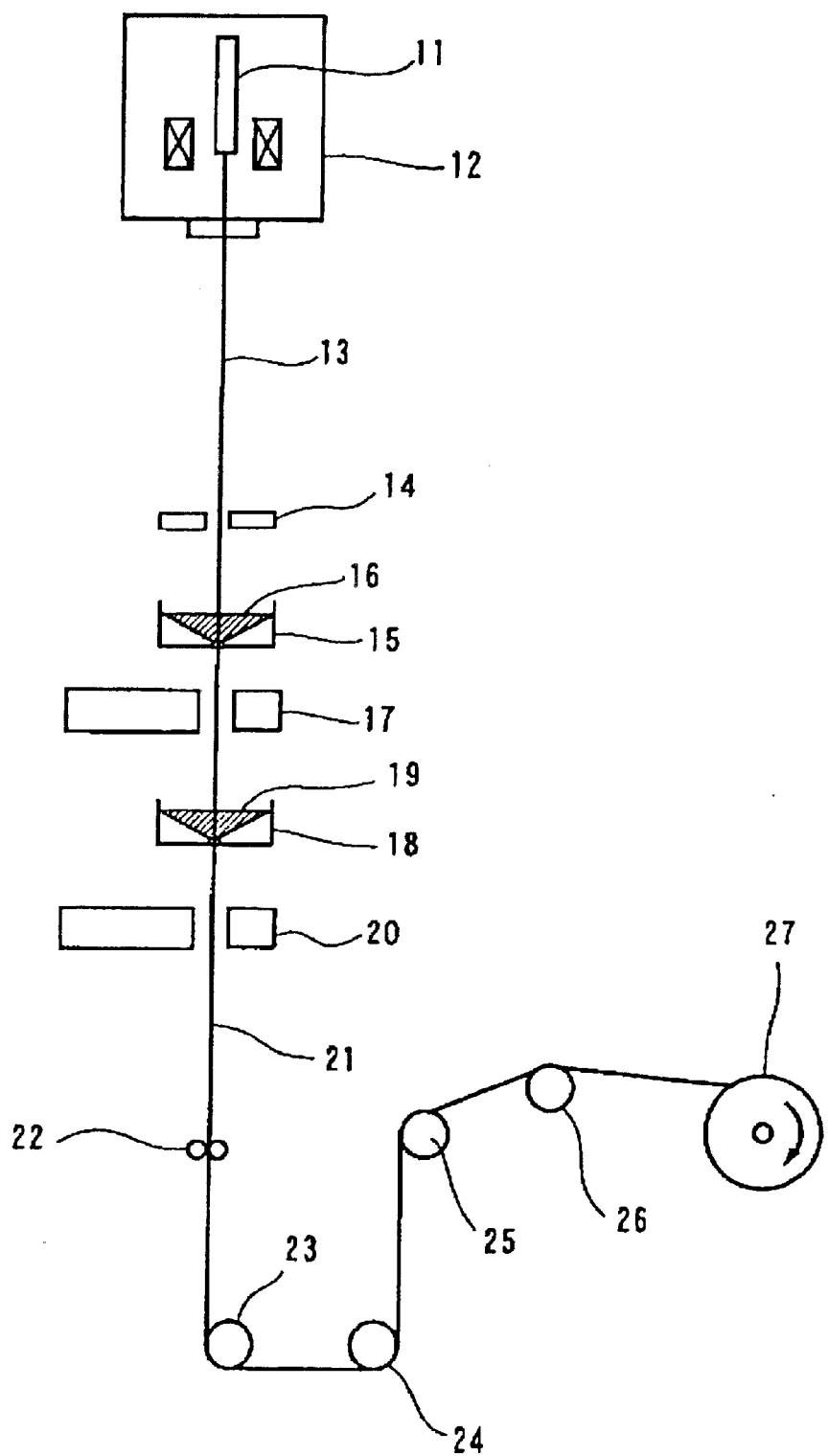
FIG. 3 is a view showing the fabrication steps of the coated optical fiber.
Figure 4:
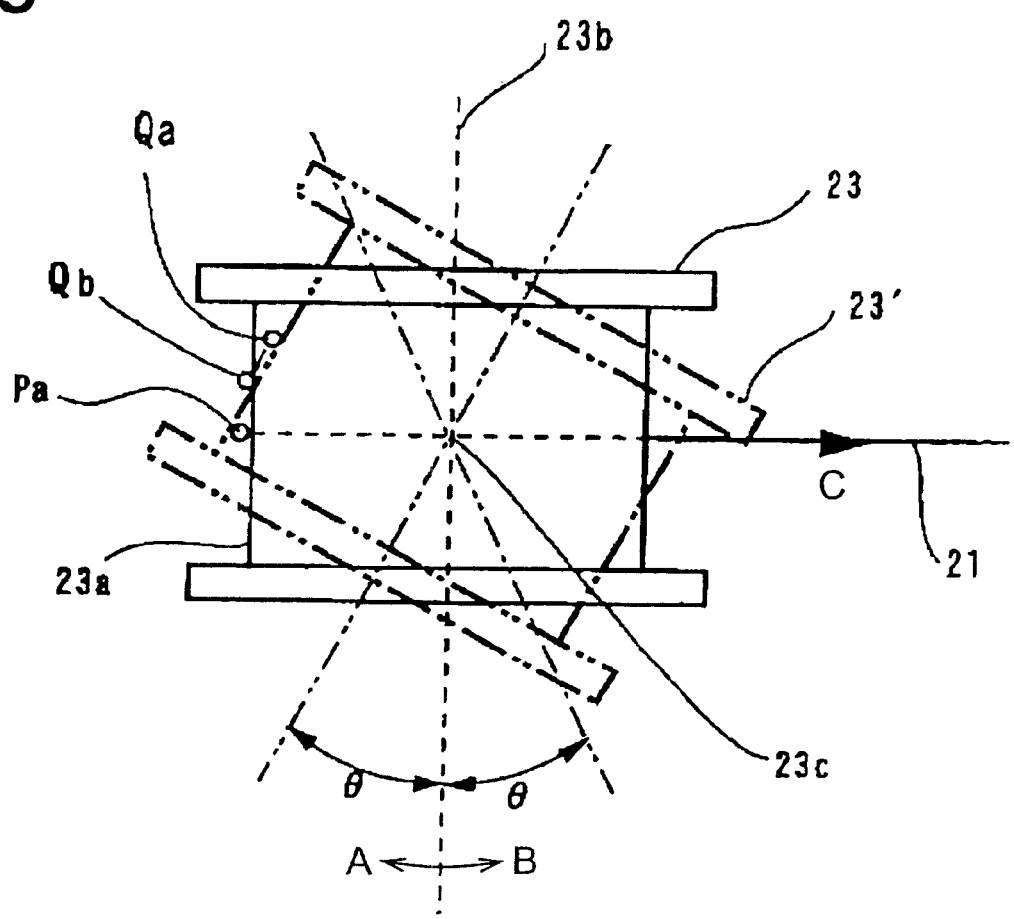
FIG. 4 is a top plan view of a swing guide roller.
Figure 5:
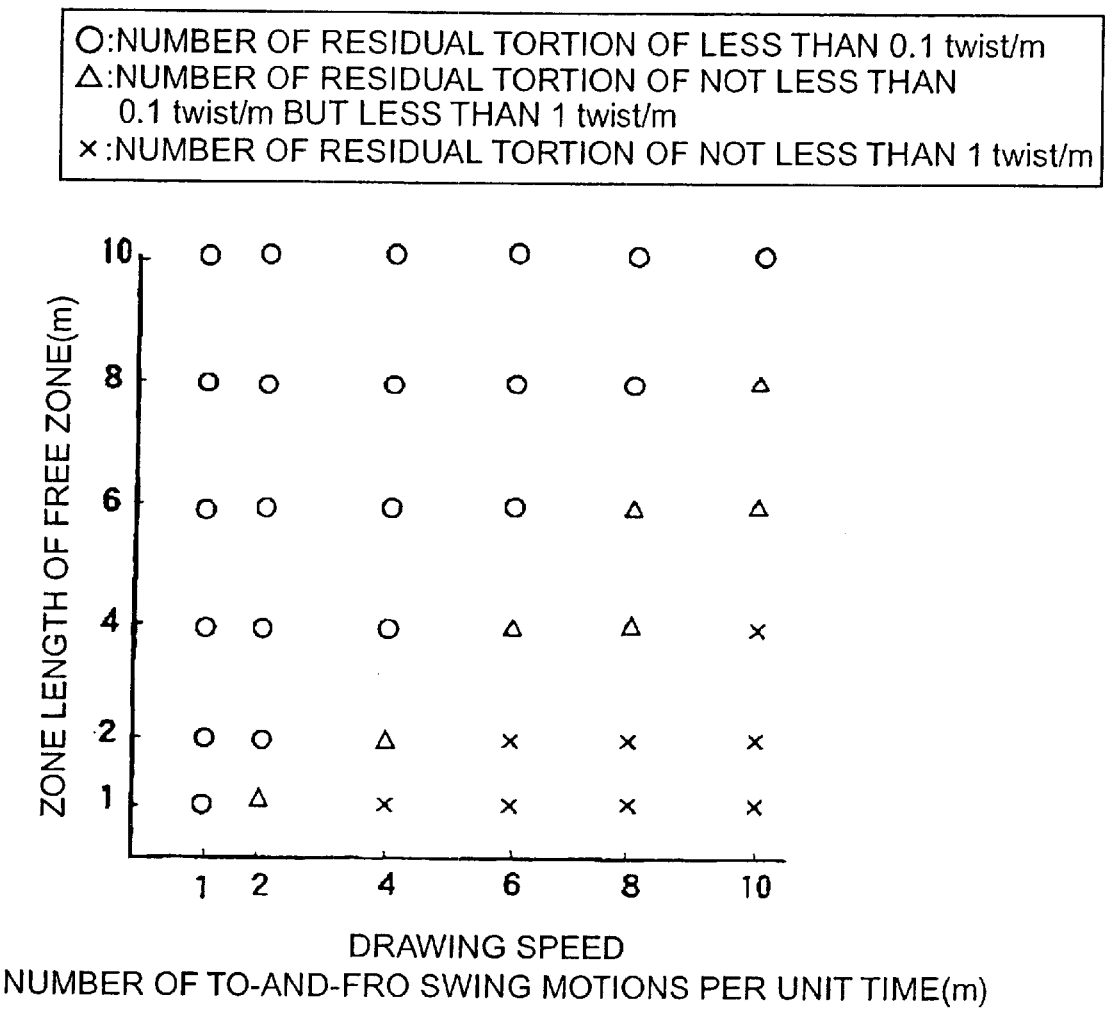
FIG. 5 is a diagram showing the numbers of residual torsion by ○, Δ, and ×, in which the abscissa represents the drawing speed/the number of clockwise and counterclockwise swing motions per unit time and the ordinate the zone length of the free zone.

FIG. 1A is a view showing an embodiment of the fabrication apparatus of coated optical fiber according to the present invention and FIG. 1B a view showing another embodiment of the free zone. The apparatus shown in FIG. 1A is constructed by providing the apparatus shown in FIG. 3, with the free zone being the feature of the present invention, and the other structure is the same as that of the apparatus of FIG. 3. Guide rollers 1 and 2 shown in FIG. 1B are guide rollers each having a smooth roller surface. In the embodiment of FIG. 1A, the take-up unit 26 and winding-up reel 27 are arranged with a large space in between, the space between them is the free zone in which the coated optical fiber 21 can travel straight without touching any other member such as a guide roller, and the zone length L of the free zone is not less than aforementioned Lo.

In this structure with the free zone, when the coated optical fiber is made to pass through the free zone, since the coated optical fiber includes the elastic torsion in the twist directions alternately inverted along the longitudinal direction, the inverted twists cancel out each other in the longitudinal direction, so as to reduce the residual torsion. In the embodiment of FIG. 1A, well-known devices can be applied to the devices except for the free zone as they are.

When the drawing speed is increased from conventionally common 150 m/min to not less than 600 m/min, it is necessary to increase the number of clockwise and counterclockwise swing motions or lengthen the length of the free zone, in order to keep the number of residual torsion not more than 0.1 twist/meter. For example, if the number of clockwise and counterclockwise swing motions is set to 50 motions/min of the conventional level, a necessary length will be 12 m for the free zone, which is not practical. On the other hand, increase in the number of clockwise and counterclockwise swing motions will result in undesirably increasing the variation in the glass diameter and degrading the appearance of the glass fiber. The variation in the glass diameter needs to be kept not more than ±0.5 μm and for that, it is preferable to set the number of clockwise and counterclockwise swing motions to not more than 300 motions/min. In this setting, the length of the free zone can be only 2 m.

The embodiment of FIG. 1B is the example of the free zone wherein the guide rollers 1 and 2 having their respective smooth roller surfaces are placed between the take-up unit 26 and the winding-up reel 27, the coated optical fiber 21 is hung on the guide rollers 1, 2, and the length L of the free zone in this example is the length of the coated optical fiber thus hung between the take-up unit and the winding-up reel. In this case the locations of the guide rollers and others are also determined so as to satisfy L≧Lo.

The guide rollers 1, 2 each having the smooth roller surface can be either of flat rollers and V-groove rollers made of aluminum, hard plastic resin, and other materials. These are preferably made of a material having Rockwell hardness HRM of 50 or higher. While the coated optical fiber is hung on the guide rollers, the coated optical fiber rolls about the axis on the roller surfaces with travel of the fiber, because the guide rollers have the hard and smooth roller surfaces. With the coated optical fiber being hung on such guide rollers provided in the free zone, there will be no particular hindrance to the longitudinal canceling of elastic torsion in the coated optical fiber.

Figure 2:
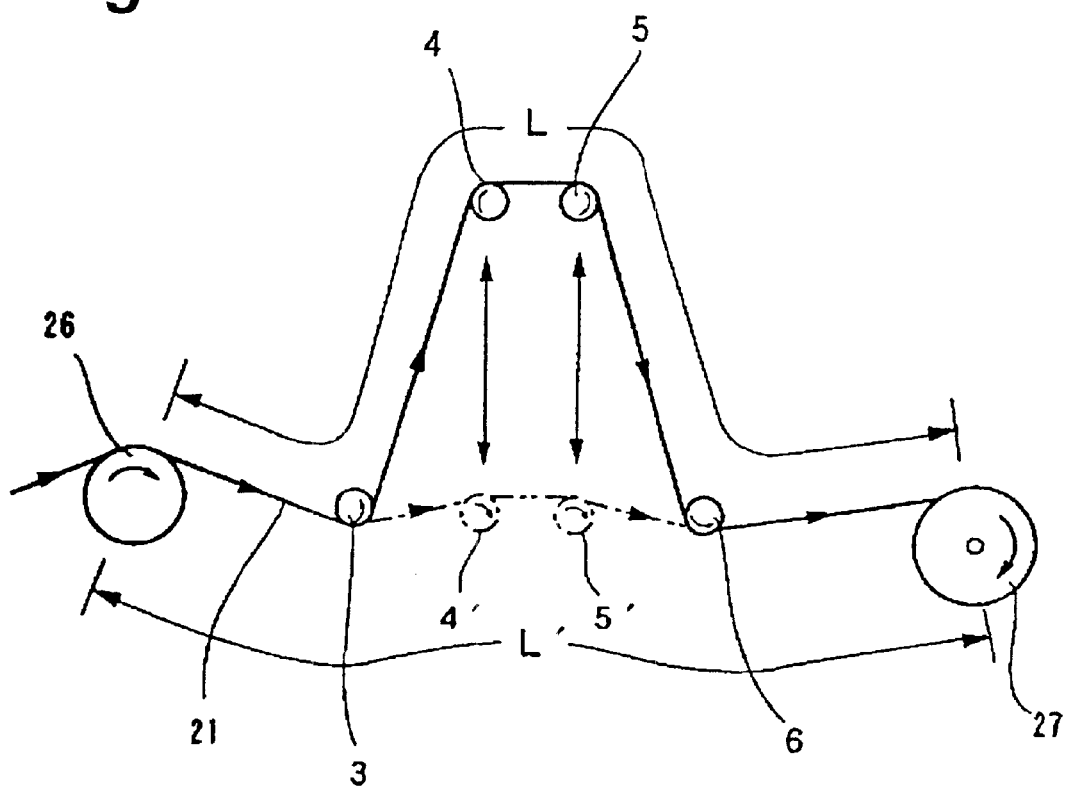
FIG. 2 is a view showing an embodiment in which movable guide rollers are provided in the free zone in the fabrication apparatus of coated optical fiber according to the present invention.

FIG. 2 is a view showing an example using movable guide rollers. Stationary guide rollers 3, 6 and movable guide rollers 4, 5 are constructed all of those each having a smooth roller surface. The movable guide rollers are normally located at their respective positions 4 and 5 and can be moved to positions 4' and 5' for fiber hanging or the like. The movement of the movable guide rollers can be implemented, for example, by use of a guide rail and a chain not illustrated. Since the stationary guide rollers 3, 6 and movable guide rollers 4, 5 are constructed of the guide rollers each having the smooth roller surface, the length of the free zone is the hanging length of the coated optical fiber between the take-up unit 26 and the winding-up reel 27.

Accordingly, the length of the free zone is L with the movable guide rollers at the positions 4, 5, whereas it is L' with the movable guide rollers at the positions 4', 5'. In this case the movable guide rollers and others are located so as to satisfy L≧Lo. The length of the free zone is decreased during the fiber hanging or the like, using such movable guide rollers, whereby the hanging work can be facilitated. Upon arrival at the normal drawing speed the movable guide rollers are moved to the positions 4, 5 and thus there is no hindrance to the longitudinal canceling of elastic torsion in the coated optical fiber.

The above embodiments showed the examples in which the free zone was provided between the take-up unit and the winding-up reel, but the free zone can be provided anywhere after the swing guide roller; e.g., even before the take-up unit. If there is no space available for the free zone in the drawing step for some reason, e.g., because of the installation place, it is also possible to reduce the residual torsion in the coated optical fiber by a method of winding the coated optical fiber with large residual torsion once on the winding-up reel as it is, again feeding the coated optical fiber out of the winding-up reel with adequate attention, and guiding the coated optical fiber through another device provided with the free zone to be again wound up on another winding-up reel.

Industrial Applicability

The fabrication method and apparatus of the coated optical fiber according to the present invention can be applied to fabrication of various coated optical fibers and can be suitably applied, particularly, to fabrication of dispersion compensating fibers causing large polarization mode dispersion.

What is claimed is:

1. A method of fabricating a coated optical fiber by heating to soften an end of an optical fiber preform to draw a glass fiber out therefrom, laying a coating on the glass fiber to make a coated optical fiber, and guiding the coated optical fiber via a swing guide roller periodically swinging, to twist the coated optical fiber, thereby imparting twists about the axis to the glass fiber inside the coated optical fiber, said method comprising a step of passing the coated optical fiber having passed said swing guide roller, through a free zone in which the coated optical fiber is allowed to freely rotate about the axis of the optical fiber, and thereby longitudinally canceling out elastic torsion stored in the coated optical fiber because of longitudinally alternate inversion of twist directions thereof, wherein a zone length L (m) of said free zone is not less than Lo (m) defined as follows:

Lo (m)=[a maximum drawing speed of the coated optical fiber (m/min)]/[the number of clockwise and counterclockwise swing motions per unit time of the swing guide roller (motions/min)].

2. The method according to claim 1, wherein the length of said free zone is adjustable.

3. The method according to claim 1, wherein the maximum drawing speed of said coated optical fiber is not less than 600 m/min and the number of clockwise and counterclockwise swing motions per unit time of the swing guide roller is not more than 300 motions/min.

4. An apparatus for fabricating a coated optical fiber, said apparatus comprising a drawing furnace for heating to soften an end of an optical fiber preform to draw a glass fiber out therefrom, a coating unit for laying a coating on the glass fiber, and a swing guide roller for twisting a coated optical fiber thus made with the coating, thereby imparting twists about the axis to said glass fiber, said apparatus comprising a free zone through which the coated optical fiber having passed the swing guide roller is made to pass in a free state of rotation about the axis, wherein a zone length L (m) of said free zone is not less than Lo (m) defined as follows:

Lo (m)=[a maximum drawing speed of the coated optical fiber (m/min)]/[the number of clockwise and counterclockwise swing motions per unit time of the swing guide roller (motions/min)].

5. The apparatus according to claim 4, wherein said free zone is a region between two guide members and is retained so that said coated optical fiber can travel straight between the two guide members while being maintained in a non-contact state with another member.

6. The apparatus according to claim 4, wherein a movable guide roller is located at least at one of the two ends of said free zone.

7. The apparatus according to claim 4, comprising at least one intermediate guide roller having a smooth roller surface for allowing the coated optical fiber to pass in a freely rotatable state about the axis, in said free zone.

8. The apparatus according to claim 7, wherein at least one of said intermediate guide roller is movable.

9. A coated optical fiber fabricated by heating to soften an end of an optical fiber preform to draw a glass fiber out therefrom and laying a coating on the glass fiber, said coated optical fiber being fabricated in such a manner that the coated optical fiber made is guided via a swing guide roller periodically swinging, to be twisted, thereby imparting twists about the axis to the glass fiber inside the coated optical fiber, and the coated optical fiber having passed said swing guide roller is made to pass through a free zone in which the coated optical fiber is allowed to freely rotate about the axis, wherein a zone length L (m) of said free zone is not less than Lo (m) defined as follows:

Lo (m)=[a maximum drawing speed of the coated optical fiber (m/min)]/[the number of clockwise and counterclockwise swing motions per unit time of the swing guide roller (motions/min)], thereby longitudinally canceling out elastic torsion stored in the coated optical fiber because of longitudinally alternate inversion of twist directions thereof.

* * * * *